(12) United States Patent
Zhang et al.

(10) Patent No.: US 11,487,492 B2
(45) Date of Patent: Nov. 1, 2022

(54) MOBILE DEVICE INTEGRATED VISUAL ENHANCEMENT SYSTEM

(71) Applicant: YUTOU TECHNOLOGY (HANGZHOU) CO., LTD., Hangzhou (CN)

(72) Inventors: Fuyao Zhang, Hangzhou (CN); Gonglue Jiang, Hangzhou (CN); Weiqi Zhao, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/421,127

(22) PCT Filed: May 28, 2019

(86) PCT No.: PCT/US2019/034228
§ 371 (c)(1),
(2) Date: Jul. 7, 2021

(87) PCT Pub. No.: WO2020/146003
PCT Pub. Date: Jul. 16, 2020

(65) Prior Publication Data
US 2022/0121411 A1 Apr. 21, 2022

Related U.S. Application Data

(60) Provisional application No. 62/789,432, filed on Jan. 7, 2019.

(51) Int. Cl.
*G06F 3/14* (2006.01)
*G06F 3/01* (2006.01)
*G06F 3/0346* (2013.01)

(52) U.S. Cl.
CPC ............ *G06F 3/1423* (2013.01); *G06F 3/011* (2013.01); *G06F 3/012* (2013.01); *G06F 3/013* (2013.01); *G06F 3/0346* (2013.01)

(58) Field of Classification Search
CPC ........ G06F 3/1423; G06F 3/011; G06F 3/012; G06F 3/013; G06F 3/016; G06F 3/017;
(Continued)

(56) References Cited

U.S. PATENT DOCUMENTS 9,361,501 B2 * 6/2016 Molisimo ............ G07G 1/0009
10,365,716 B2 * 7/2019 Aimone .................. G06F 16/90
(Continued)

OTHER PUBLICATIONS

PCT/US19/34228—International Search Report, dated Aug. 15, 2019, 2 pages.
(Continued)

*Primary Examiner* — Vijay Shankar
(74) *Attorney, Agent, or Firm* — Getech Law LLC; Jun Ye

(57) ABSTRACT

Aspects of a mobile device integrated visual enhancement system are described herein. The aspects may include a wearable display headset that includes one or more display modules and a mobile device communicatively connected with the wearable display headset. The mobile device may include a first screen, a display detection module configured to detect the one or more display modules and receive display parameters from the wearable display headset, and a content delivery module configured to deliver visual content on the one or more detected display modules in accordance with the display parameters.

19 Claims, 4 Drawing Sheets

(58) Field of Classification Search
CPC .............. G06F 3/0346; G06F 3/04883; G06F 2203/0384; G06F 3/147; G02B 27/01; G02B 27/017; G02B 7/12; G02B 27/0172; G02B 2027/014; G09G 5/12; G09G 2354/00; G09G 2370/04; G09G 2370/16; G09G 3/003
See application file for complete search history.

(56) References Cited

U.S. PATENT DOCUMENTS

| | | |
|---|---|---|
| 2002/0015008 A1 | 2/2002 | Kishida et al. |
| 2007/0220108 A1* | 9/2007 | Whitaker ............ H04M 1/6041 709/217 |
| 2014/0176417 A1 | 6/2014 | Young et al. |
| 2014/0267940 A1 | 9/2014 | Ackerman et al. |
| 2014/0291396 A1 | 10/2014 | Molisimo et al. |
| 2014/0347265 A1 | 11/2014 | Aimone et al. |
| 2016/0018978 A1 | 1/2016 | Zenoff |

OTHER PUBLICATIONS

PCT/US19/34228—Written Opinion of the International Searching Authority, dated Aug. 15, 2019, 7 pages.

\* cited by examiner

MOBILE DEVICE INTEGRATED VISUAL ENHANCEMENT SYSTEM

CROSS REFERENCE TO RELATED APPLICATIONS

This application is a 371 of international application PCT/US19/34228, filed May 28, 2019, which claims the benefit and priority of U.S. Provisional Application 62/789,432, filed Jan. 7, 2019, which is hereby incorporated by reference in its entirety.

BACKGROUND

Various devices have been developed for visual enhancement technology such as virtual reality (VR), augmented reality (AR), mixed reality (MR), etc. Typically, such devices may include a main console and one or more remote controllers. For example, Oculus® gaming set may include two remote ring-shaped controllers. PlayStation® gaming set also includes two remote sticks called PlayStation Move® or a gun-shaped VR aim controller.

However, current solutions for visual enhancement technology may require a stand-alone computing device and one or more wired or remote controllers. These solutions may meet the needs of indoor applications of visual enhancement technology but the immobility of the computing device may lead to inconvenience and limit the application scenarios. Further, the additional remote controllers may result in extra cost and need extra power supply.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example visual enhancement system. The example virtual reality system may include a wearable display headset that includes one or more display modules and a mobile device communicatively connected with the wearable display headset. The mobile device may include a first screen, a display detection module configured to detect the one or more display modules and receive display parameters from the wearable display headset, and a content delivery module configured to deliver visual content on the one or more detected display modules in accordance with the display parameters.

Another example aspect of the present disclosure provides an exemplary method for controlling a visual enhancement system. The example method may include detecting, by a display detection module of a mobile device, one or more display modules of a wearable display headset in addition to a first screen of the mobile device; receiving, by the display detection module of the mobile device, display parameters of the one or more display modules from the wearable display headset; and delivering, by a content delivery module of the mobile device, visual content on the one or more detected display modules in accordance with the display parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

The present disclosure provides a mobile device integrated in a visual enhancement system to overcome the immobility of the current systems. For example, a wearable display headset that includes one or more display modules, e.g., OLED or waveguide modules, may be communicatively connected to a mobile device. Processors of the mobile device may be configured to perform computation tasks such as decoding video files, responding to gestures, etc., and further to control the operations at the wearable display headset. For example, the mobile device may be configured to control a camera at the wearable display headset. By tapping an icon at the screen of the mobile device, a user can take a photo using the camera at the wearable display headset. In another example, images captured at the camera may be transmitted to and displayed on the mobile device.

Figure 1:
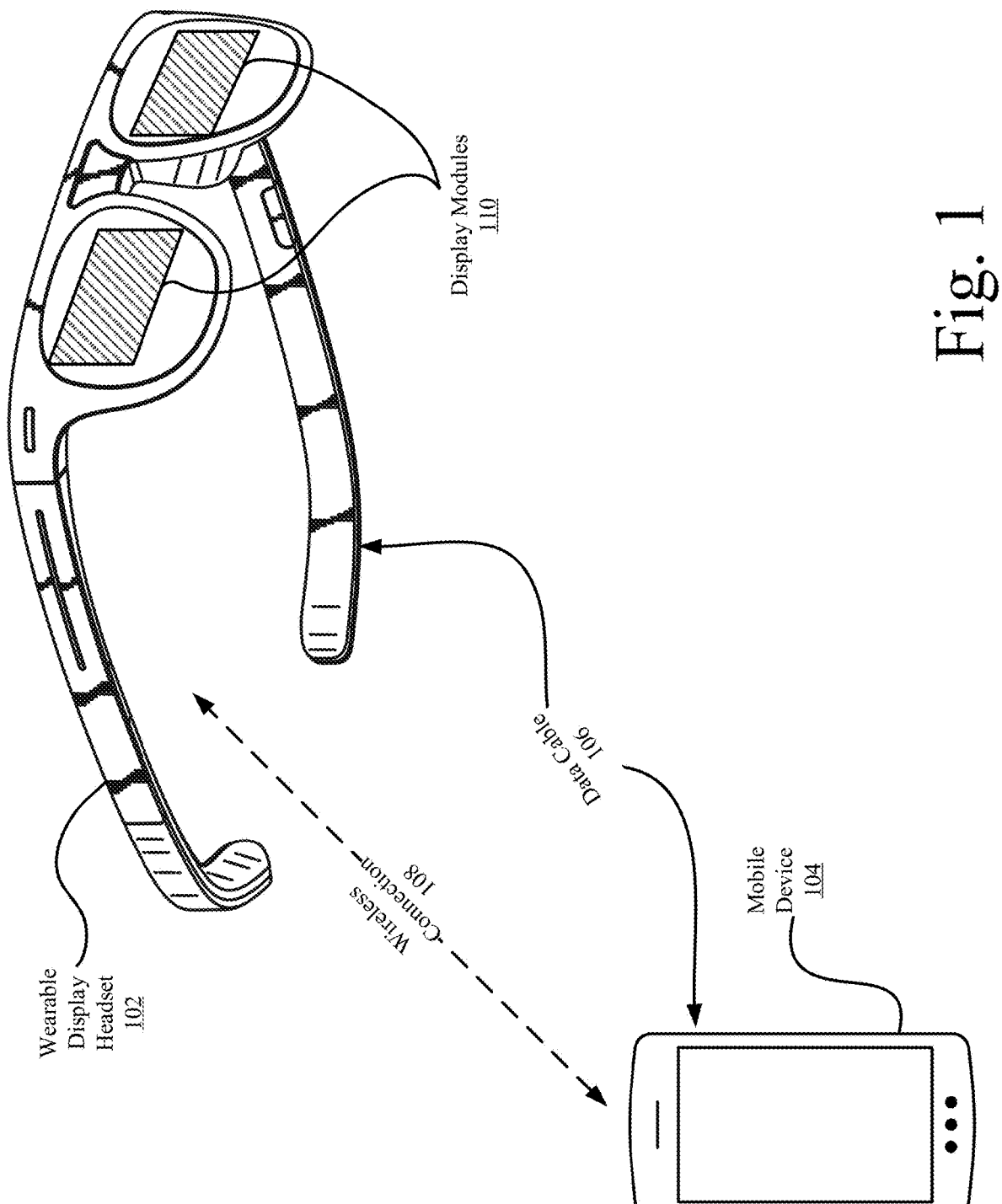
FIG. 1 illustrates a block diagram of an example visual enhancement system in which a mobile device may be integrated.

FIG. 1 illustrates a block diagram of an example visual enhancement system 100 in which a mobile device may be integrated. As depicted, the example visual enhancement system 100 may include a wearable display headset 102 and a mobile device 104 communicatively connected to the wearable display headset 102. The wearable display headset 102 may refer to a glasses-shaped headset or other head-mounted devices with lenses. In some examples, the wearable display headset 102 may include one or more display modules 110 respectively configured to display content at the two lenses of the wearable display headset 102. The display modules 110 may refer to one or more organic light emitting diode (OLED) modules, liquid crystal display (LCD) modules, laser display modules, etc.

Additionally, in at least some examples, the wearable display headset 102 may include one or more sensors and one or more cameras. For example, the wearable display headset 102 may include sensors such as inertial measurement unit (IMU), accelerometer, gyrometer, proximity sensor, depth camera, etc.

The mobile device 104 may be connected to the wearable display headset 102 wirelessly according to one or more wireless communication protocols, e.g., Bluetooth, Wi-Fi, etc. Alternatively, or additionally, the mobile device 104 may be connected to the wearable display headset 102 via a data cable 106 in accordance with one or more data transmission protocols such as Universal Serial Bus (USB). Examples of the mobile device 104 may include smart phones, tablets, laptops, smart watches, personal digital assistants (PDAs).

In some examples, a user operating on the mobile device 104 may control the operations at the wearable display headset 102 via the mobile device 104. In some other examples, data collected by the sensors in the wearable display headset 102 may be transmitted back to the mobile device 104 for further processing or storage. Further details of the examples are described in accordance with FIG. 2.

Figure 2:
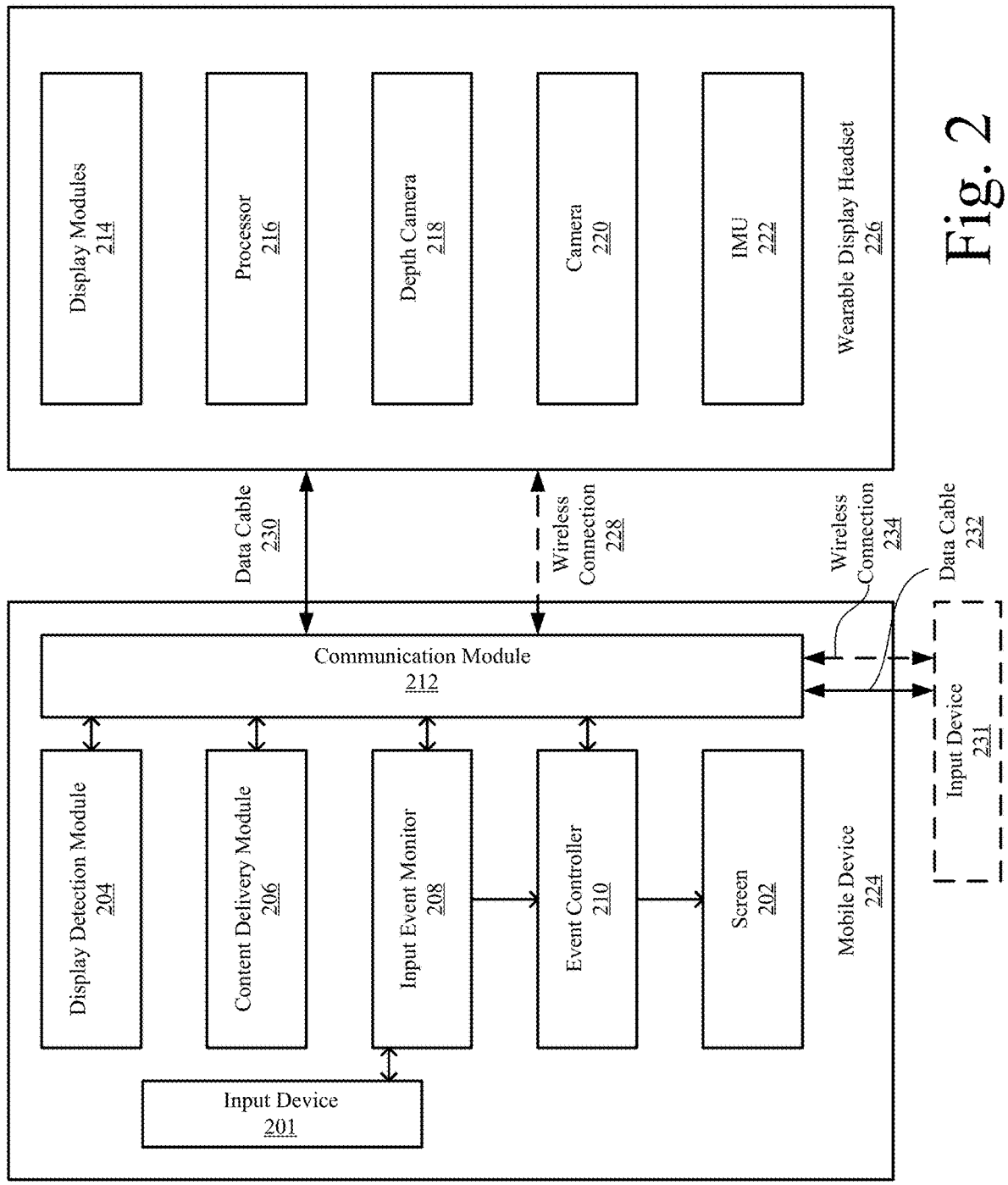
FIG. 2 illustrates a detailed block diagram of the example visual enhancement system in which a mobile device may be integrated.

FIG. 2 illustrates a detailed block diagram of the example visual enhancement system 200 in which a mobile device may be integrated. The example visual enhancement system 200, as depicted, may include a mobile device 224 communicatively connected to a wearable display headset 226 via either a data cable 230 (e.g., a USB cable) or a wireless connection 228. The wireless connection 228 may be established in accordance with one or more protocols or standards such as Bluetooth, Wi-Fi, Google Cast, Miracast, etc.

The wearable display headset 226 may include one or more display modules 214. As described above, the display modules 214 may similarly refer to one or more organic light emitting diode (OLED) modules, liquid crystal display (LCD) modules, laser display modules, etc.

In some examples, the wearable display headset 226 may include a processor 216 configured to process data collected by one or more sensors of the wearable display headset 226. For example, the sensors may include a depth camera 218 configured to collect distance information of objects, a camera 220 configured to capture images, and an inertial measurement unit (IMU) 222 configured to measure linear acceleration and rotational rate. The data collected by the sensors may be processed by the processor 216 and transmitted to the mobile device 224 via either the data cable 230 or the wireless connection 228. A communication module 212 of the mobile device 224 may be configured to establish the wireless connection 228 and/or interface with the wearable display headset 226 to facilitate communication between the mobile device and the wearable display headset 226. In at least some examples, the communication module 212 may include one or more sub-modules including a Wi-Fi module, a Bluetooth module, an IEEE 802 series standard module, a radio RF module, etc.

The mobile device 224 may be configured to host at least an operating system (OS) configured to manage hardware components of the mobile device 224 and software resources running at the mobile device 224. Examples of the OS may include iOS®, Android®, Microsoft Windows®, Linux®, etc.

In at least some examples, the mobile device 224 may include a display detection module 204 configured to detect whether a display is connected to the mobile device 224. For example, the display detection module 204 may refer to DisplayManager API (or MediaRouter API) of Android system and may be configured to detect if a display (e.g., a TV, a monitor, a projector) is connected to the mobile device 224. In some other examples, the display detection module 204 may refer to hardware components, firmware components, or any combination thereof.

In the present disclosure, the display detection module 204 may be configured to detect whether the display modules 214 are connected to the mobile device 224 via either the data cable 230 or the wireless connection 228. If the display detection module 204 detects that the display modules 214 are connected to the mobile device 224, the display detection module 204 may be further configured to retrieve one or more parameters of the display modules 214. The parameters may include respective resolutions of the display modules 214, respective orientations of the display modules 214, etc.

Further, the mobile device 224 may include a content delivery module 206 configured to deliver visual content to the detected display modules 214. For example, the content delivery module 206 may be configured to deliver a graphical user interface (GUI) or a video clip to the display modules 214. In some examples, the content delivery module 206 may be configured to deliver different visual content to a screen 202 and the display modules 214. For instance, when the content delivery module 206 is running as a back end service in Android system, an interface showing an incoming call may be displayed by the content delivery module 206 at the screen 202 and a video clip may be delivered to the display modules 214 such that the video clip may not be interrupted by the incoming call. In some other examples, the content delivery module 206 may be configured to deliver different visual content respectively to each of the display modules 214. For example, the content delivery module 206 may deliver a left eye view and a right eye view respectively for the display modules 214 for playing a 3D video such that the user wearing the wearable display headset 226 may have 3D experience. In an Android system, the content delivery module 206 may refer to Presentation API. In some other examples, the content delivery module 206 may refer to hardware components, firmware components, or any combination thereof.

The mobile device 224, in at least some examples, may further include an input device 201 configured to receive inputs from a user. The input device 201 may include a touch screen, a physical keyboard, one or more microphones for receiving the user's voice commands, etc. Thus, the inputs from a user may include tapping on the touch screen, clicking on the mobile device, swiping on the touch screen, or typing on the physical keyboard. In some examples, an additional input device 231 may be connected to the mobile device 224 via a data cable 232 or a wireless connection 234. The wireless connection 234 may be similarly established in accordance with one or more protocols or standards such as Bluetooth, Wi-Fi, Google Cast, Miracast, etc. The input device 231 may include a remote controller, a mouse, a wired keyboard, a microphone, etc.

Further, the mobile device 224 may include an input event monitor 208 configured to monitor or detect the inputs at the input device 201. Once an input is detected at the input device 201 by the input event monitor 208, the input event monitor 208 may be configured to transmit information regarding the input to an event controller 210 of the mobile device 224. The event controller 210 may be configured to identify an operation associated with the input. In some examples, the event controller 210 may be configured to perform the identified operation. For example, when the input device 201 receives a tapping on an icon that indicates "play video", the event controller 210 may be configured to identify an operation to play a video clip and subsequently perform the operation. The video clip may then be displayed at the screen 202 of the mobile device 224 or transmitted to the wearable display headset 226. The display modules 214 may then be configured to display the video clip.

Alternatively, or additionally, the identified operation may be transmitted to the wearable display headset 226 via the data cable 230 or the wireless connection 228. The processor 216 may be configured to perform the identified operation, e.g., decode and play the video clip at the display modules 214.

In a non-limiting example, the user may click a physical or virtual button on the mobile device 224 attempting to take a photo using a camera included in the mobile device 224 (not shown). The input device 201 may receive the input, e.g., clicking the button, and the input event monitor 208 may detect the clicking and identify an operation, e.g., taking a photo, associated with the clicking. The event controller 210 may be configured to control the camera of the mobile device 224 to take a photo. The photo may then be transmitted to the wearable display headset 226 and displayed on the display modules 214.

Alternatively, the user may click another physical or virtual button on the mobile device 224 attempting to take a photo using the camera 220 in the wearable display headset 226. The input device 201 may receive the input, e.g., clicking the button, and the input event monitor 208 may detect the clicking and identify another operation, e.g., taking a photo using the camera 220, associated with the clicking. The event controller 210 may be configured to transmit the identified operation to the wearable display headset 226. The processor 216 may be configured to perform the identified operation, e.g., taking a photo with the camera 220. The photo may be transmitted back to the mobile device 224 and displayed at the screen 202.

In another non-limiting example, the user may swipe at the touch screen of the mobile device 224, e.g., the screen 202, attempting to change a view at the display modules 214.

The input device 201 may receive the input, e.g., the swiping, and the input event monitor 208 may detect the swiping and identify an operation associated with the swiping, e.g., changing a displayed photo at the wearable display headset 226. The event controller 210 may be configured to transmit the identified operation to the wearable display headset 226. The processor 216 may be configured to performed operation, e.g., changing a displayed photo at the display modules 214.

Figure 3:
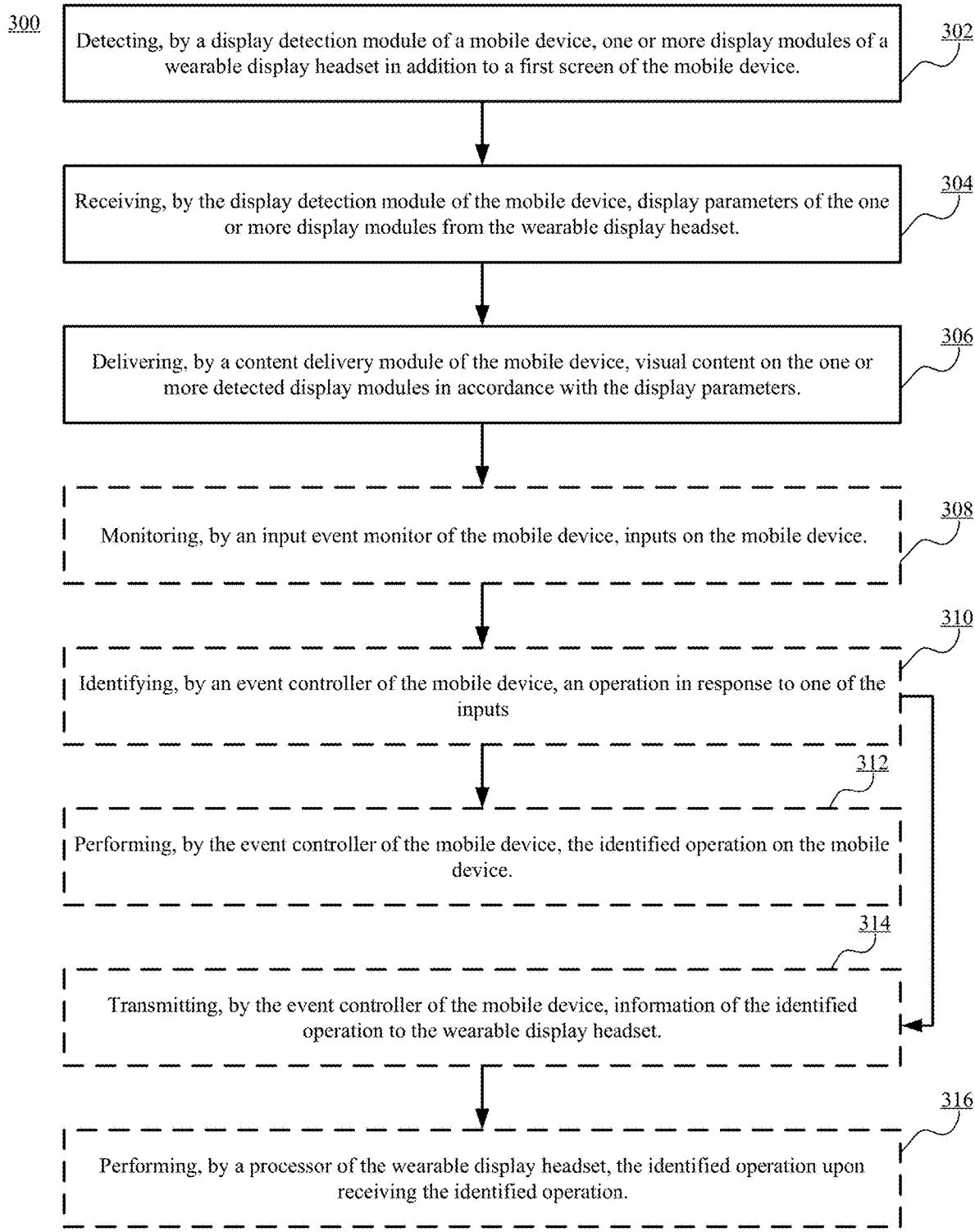
FIG. 3 illustrates a flow chart of an example process for controlling a visual enhancement system.

FIG. 3 illustrates a flow chart of an example process 300 for controlling a visual enhancement system. The example process 300 may be performed by one or more components described in accordance with FIGS. 1 and 2. Dash-lined blocks may indicate optional operations in the example process 300.

At block 302, the example process 300 may include detecting, by a display detection module of a mobile device, one or more display modules of a wearable display headset in addition to a first screen of the mobile device. For example, the display detection module 204 may be configured to detect whether a display is connected to the mobile device 224. For example, the display detection module 204 may refer to DisplayManager API (or MediaRouter API) of Android system and may be configured to detect if a display (e.g., a TV, a monitor, a projector) is connected to the mobile device 224. In the present disclosure, the display detection module 204 may be configured to detect whether the display modules 214 are connected to the mobile device 224 via either the data cable 230 or the wireless connection 228.

At block 304, the example process 300 may include receiving, by the display detection module of the mobile device, display parameters of the one or more display modules from the wearable display headset. For example, if the display detection module 204 detects that the display modules 214 are connected to the mobile device 224, the display detection module 204 may be further configured to retrieve one or more parameters of the display modules 214. The parameters may include respective resolutions of the display modules 214, respective orientations of the display modules 214, etc.

At block 306, the example process 300 may include delivering, by a content delivery module of the mobile device, visual content on the one or more detected display modules in accordance with the display parameters. For example, the content delivery module 206 may be configured to deliver a graphical user interface (GUI) or a video clip to the display modules 214. In some examples, the content delivery module 206 may be configured to deliver different visual content to a screen 202 and the display modules 214. For instance, when the content delivery module 206 is running as a back end service in Android system, an interface showing an incoming call may be displayed by the content delivery module 206 at the screen 202 and a video clip may be delivered to the display modules 214 such that the video clip may not be interrupted by the incoming call. In some other examples, the content delivery module 206 may be configured to deliver different visual content respectively to each of the display modules 214. For example, the content delivery module 206 may deliver a left eye view and a right eye view respectively for the display modules 214 for playing a 3D video such that the user wearing the wearable display headset 226 may have 3D experience. In an Android system, the content delivery module 206 may refer to Presentation API. In some other examples, the content delivery module 206 may refer to hardware components, firmware components, or any combination thereof.

At block 308, the example process 300 may include monitoring, by an input event monitor of the mobile device, inputs on the mobile device. For example, the input event monitor 208 may be configured to monitor or detect the inputs at the input device 201. Once an input is detected at the input device 201 by the input event monitor 208, the input event monitor 208 may be configured to transmit information regarding the input to the event controller 210 of the mobile device 224.

At block 310, the example process 300 may include identifying, by an event controller of the mobile device, an operation in response to one of the inputs. For example, the event controller 210 may be configured to identify an operation associated with the input. Depending on the identified operation, the example process 300 may continue to block 312 or block 314.

At block 312, the example process 300 may include performing, by the event controller of the mobile device, the identified operation on the mobile device. In some examples, the event controller 210 may be configured to perform the identified operation. For example, when the input device 201 receive a tapping on an icon that indicates "play video." The event controller 210 may be configured to identify an operation to play a video clip and subsequently perform the operation.

At block 314, the example process 300 may include transmitting, by the event controller of the mobile device, information of the identified operation to the wearable display headset. For example, alternatively, or additionally, the identified operation may be transmitted to the wearable display headset 226 via the data cable 230 or the wireless connection 228.

At block 316, the example process 300 may include performing, by a processor of the wearable display headset, the identified operation upon receiving the identified operation. For example, the processor 216 may be configured to perform the identified operation, e.g., decode and play the video clip at the display modules 214.

Figure 4A:
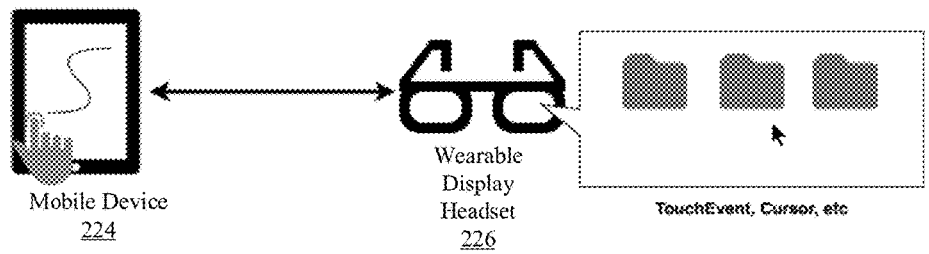
FIG. 4A illustrates an example visual enhancement system in which a mobile device may be integrated.

FIG. 4A illustrates an example visual enhancement system in which a mobile device may be integrated. As depicted, the mobile device 224 may be communicatively connected to the wearable display headset 226. The input device 201 may include a touch screen to receive user's inputs, e.g., swiping or moving fingers on the touch screen. The input event monitor 208 may be configured to monitor and detect the user's inputs. The event controller 210 may be configured to identify an operation associated with the swiping on the touch screen, e.g., moving a cursor. The identified operation may be transmitted to the wearable display headset 226. The processor 216 may be configured to perform the operation to move the cursor displayed at the display modules 214.

Figure 4B:
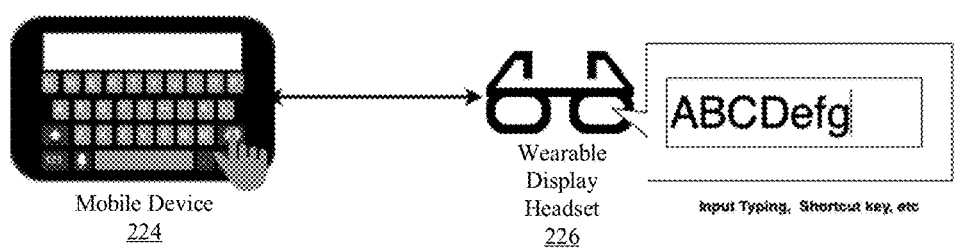
FIG. 4B illustrates an example visual enhancement system in which a mobile device may be integrated.

FIG. 4B illustrates an example visual enhancement system in which a mobile device may be integrated. As depicted, the mobile device 224 may be communicatively connected to the wearable display headset 226. The input device 201 may include a virtual keyboard displayed at a touch screen to receive user's inputs, e.g., clicking or tapping a key icon on the touch screen. The input event monitor 208 may be configured to monitor and detect the user's inputs. The event controller 210 may be configured to identify an operation associated with the clicking or tapping on the touch screen, e.g., displaying a letter corresponding to the key icon. The identified operation may be transmitted to the wearable display headset 226. The processor 216 may be configured to perform the operation to display a corresponding letter at the display modules 214.

Figure 4C:
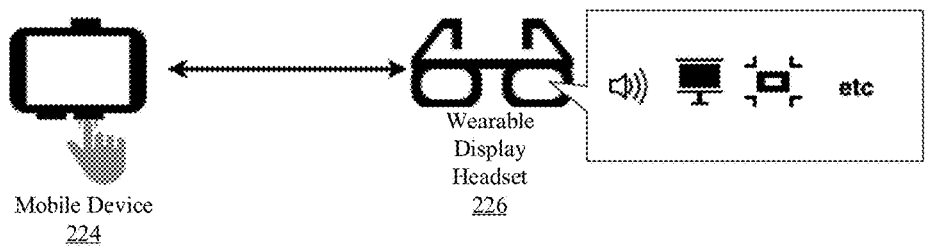
FIG. 4C illustrates an example visual enhancement system in which a mobile device may be integrated.

FIG. 4C illustrates an example visual enhancement system in which a mobile device may be integrated. As depicted, the mobile device 224 may be communicatively connected to the wearable display headset 226. The input device 201 may include one or more physical buttons to receive user's inputs, e.g., pressing the physical buttons. The input event monitor 208 may be configured to monitor and detect the user's inputs. The event controller 210 may be configured to identify an operation associated with the pressing, e.g., increasing or decreasing the volume of the wearable display headset 226. The identified operation may be transmitted to the wearable display headset 226. The processor 216 may be configured to perform the operation to increase or decrease the volume of speakers included in the wearable display headset 226.

Figure 4D:
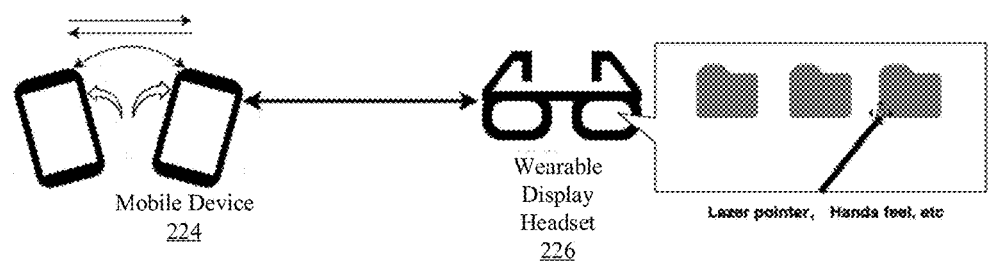
FIG. 4D illustrates an example visual enhancement system in which a mobile device may be integrated.

FIG. 4D illustrates an example visual enhancement system in which a mobile device may be integrated. As depicted, the mobile device 224 may be communicatively connected to the wearable display headset 226. The input device 201 may include an inertial measurement unit (IMU) to receive user's inputs, e.g., moving the mobile device 224. The input event monitor 208 may be configured to monitor and detect the user's inputs. The event controller 210 may be configured to identify an operation associated with the moving of the mobile device 224, e.g., changing a position of a virtual pointer at the display modules 214. The identified operation may be transmitted to the wearable display headset 226. The processor 216 may be configured to perform the operation to change the position of the virtual pointer at the display modules 214.

Figure 4E:
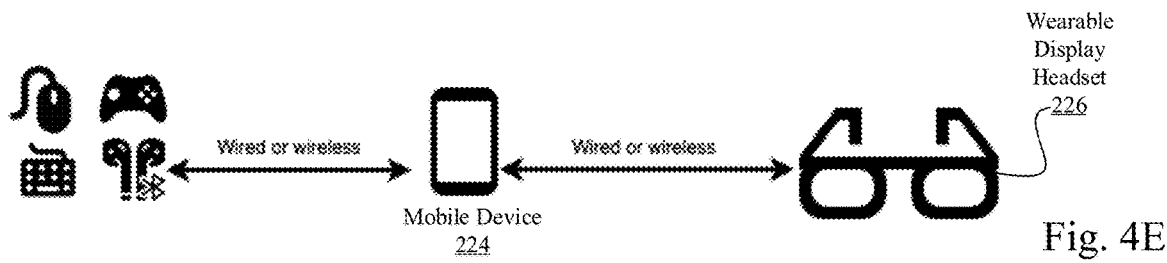
FIG. 4E illustrates an example visual enhancement system in which a mobile device may be integrated.

FIG. 4E illustrates an example visual enhancement system in which a mobile device may be integrated. As depicted, the mobile device 224 may be communicatively connected to the wearable display headset 226. One or more additional input devices (e.g., input device 231) may be connected to the mobile device 224. Inputs received at the input device 231 may be monitored and detected by the input event monitor 208. The event controller 210 may be configured to identify an operation associated with the input. The identified operation may be transmitted to the wearable display headset 226. The processor 216 may be configured to perform the operation.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A visual enhancement system, comprising:
    a wearable display headset that includes one or more display modules and one or more lenses, wherein the one or more display modules are configured to display contents at the one or more lenses respectively for a viewer that wears the wearable display headset; and
    a mobile device communicatively connected with the wearable display headset, wherein the mobile device includes:
        a first screen,
        a display detection module configured to detect the one or more display modules and receive display parameters from the wearable display headset, and
        a content delivery module configured to deliver visual content on the one or more detected display modules in accordance with the display parameters, wherein the visual content delivered to the display modules is different from content showed on the first screen.

2. The visual enhancement system of claim 1, further comprising an input event monitor configured to monitor inputs on the mobile device.

3. The visual enhancement system of claim 2, wherein the inputs include one or more of tapping on the first screen, clicking on the mobile device, swiping on the first screen, or typing on the mobile device.

4. The visual enhancement system of claim 2, further comprising an event controller configured to identify an operation in response to one of the inputs.

5. The visual enhancement system of claim 4, wherein the event controller is further configured to perform the identified operation on the mobile device.

6. The visual enhancement system of claim 4, wherein the event controller is further configured to transmit information of the identified operation to the wearable display headset.

7. The visual enhancement system of claim 6, wherein the wearable display headset includes a processor configured to perform the identified operation upon receiving the identified operation.

8. The visual enhancement system of claim 1, wherein the mobile device is communicatively connected to the wearable display headset wirelessly in accordance with one of one or more wireless communication protocols that include Bluetooth and Wi-Fi.

9. The visual enhancement system of claim 1, wherein the mobile device is communicatively connected to the wearable display headset via a data cable.

10. The visual enhancement system of claim 1, wherein the content delivery module is further configured to deliver different visual content respectively to the one or more detected display modules.

11. The visual enhancement system of claim 10, wherein the different visual content includes a first view for one of the display modules and a second view for another of the display modules.

12. The visual enhancement system of claim 1, wherein the display parameters include resolutions of the one or more display modules.

13. A method for controlling a visual enhancement system, comprising:
    detecting, by a display detection module of a mobile device, one or more display modules of a wearable display headset in addition to a first screen of the mobile device,
        wherein the wearable display headset further includes one or more lenses, and
        wherein the one or more display modules are configured to display contents at the one or more lenses respectively for a viewer that wears the wearable display headset;
    receiving, by the display detection module of the mobile device, display parameters of the one or more display modules from the wearable display headset; and
    delivering, by a content delivery module of the mobile device, visual content on the one or more detected display modules in accordance with the display parameters, wherein the visual content delivered to the display modules is different from content showed on the first screen.

14. The method of claim 13, further comprising monitoring, by an input event monitor of the mobile device, inputs on the mobile device.

15. The method of claim 13, further comprising identifying, by an event controller of the mobile device, an operation in response to one of the inputs.

16. The method of claim 15, further comprising performing, by the event controller of the mobile device, the identified operation on the mobile device.

17. The method of claim 15, further comprising transmitting, by the event controller of the mobile device, information of the identified operation to the wearable display headset.

18. The method of claim 17, further comprising performing, by a processor of the wearable display headset, the identified operation upon receiving the identified operation.

19. The method of claim 13, further comprising delivering, by the content delivery module of the mobile device, different visual content respectively to the one or more detected display modules.

* * * * *